UNITED STATES PATENT OFFICE.

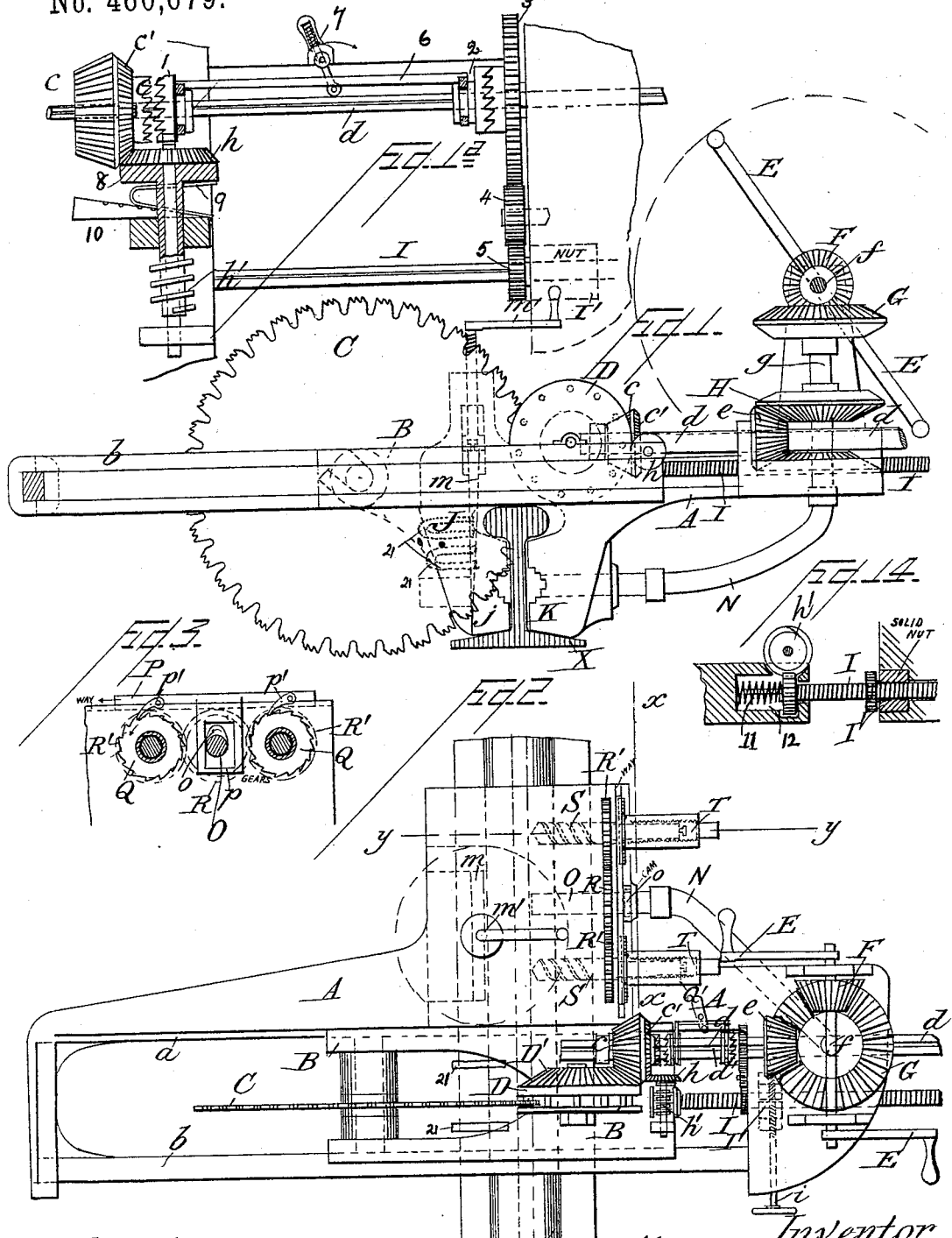

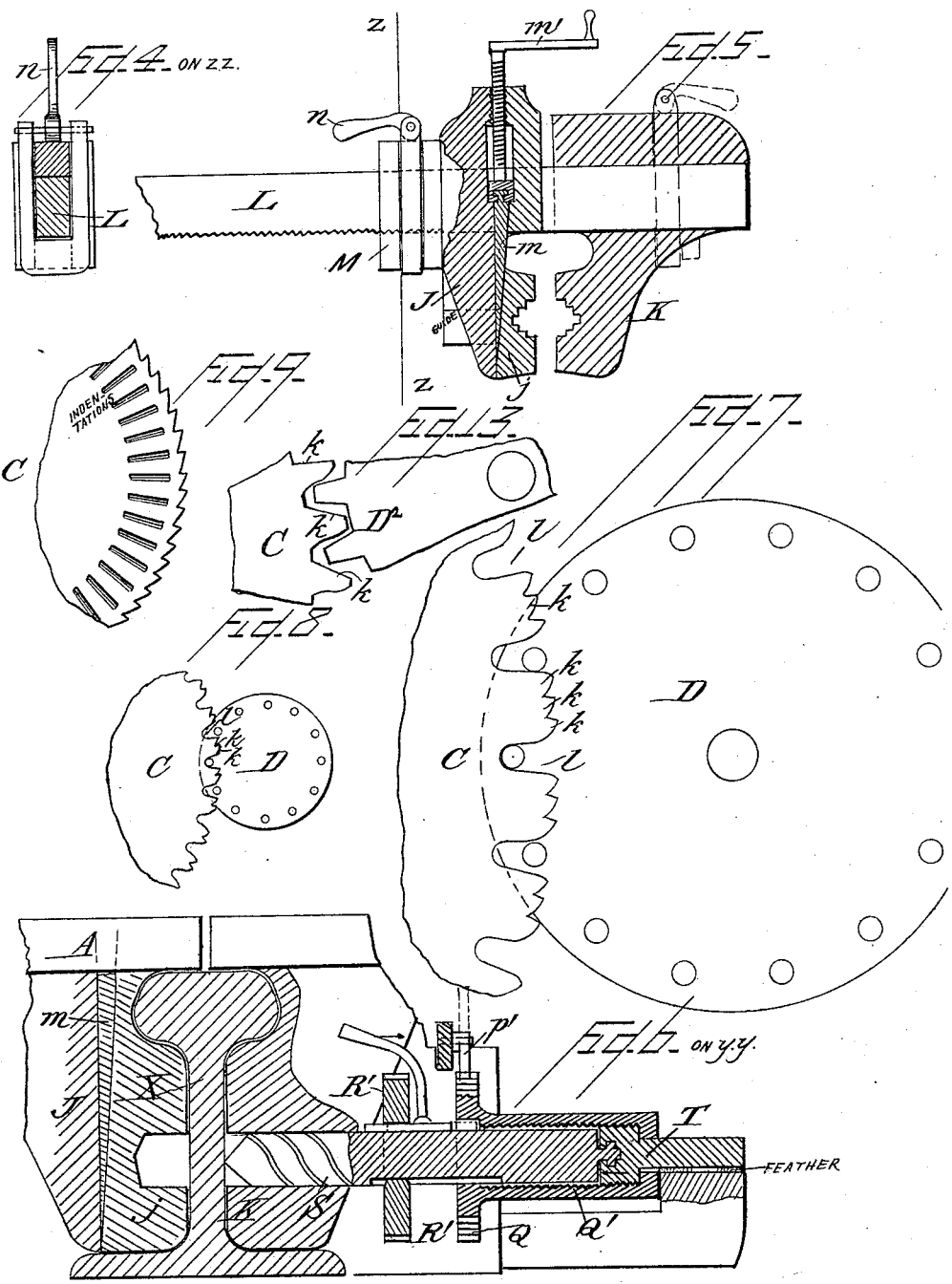

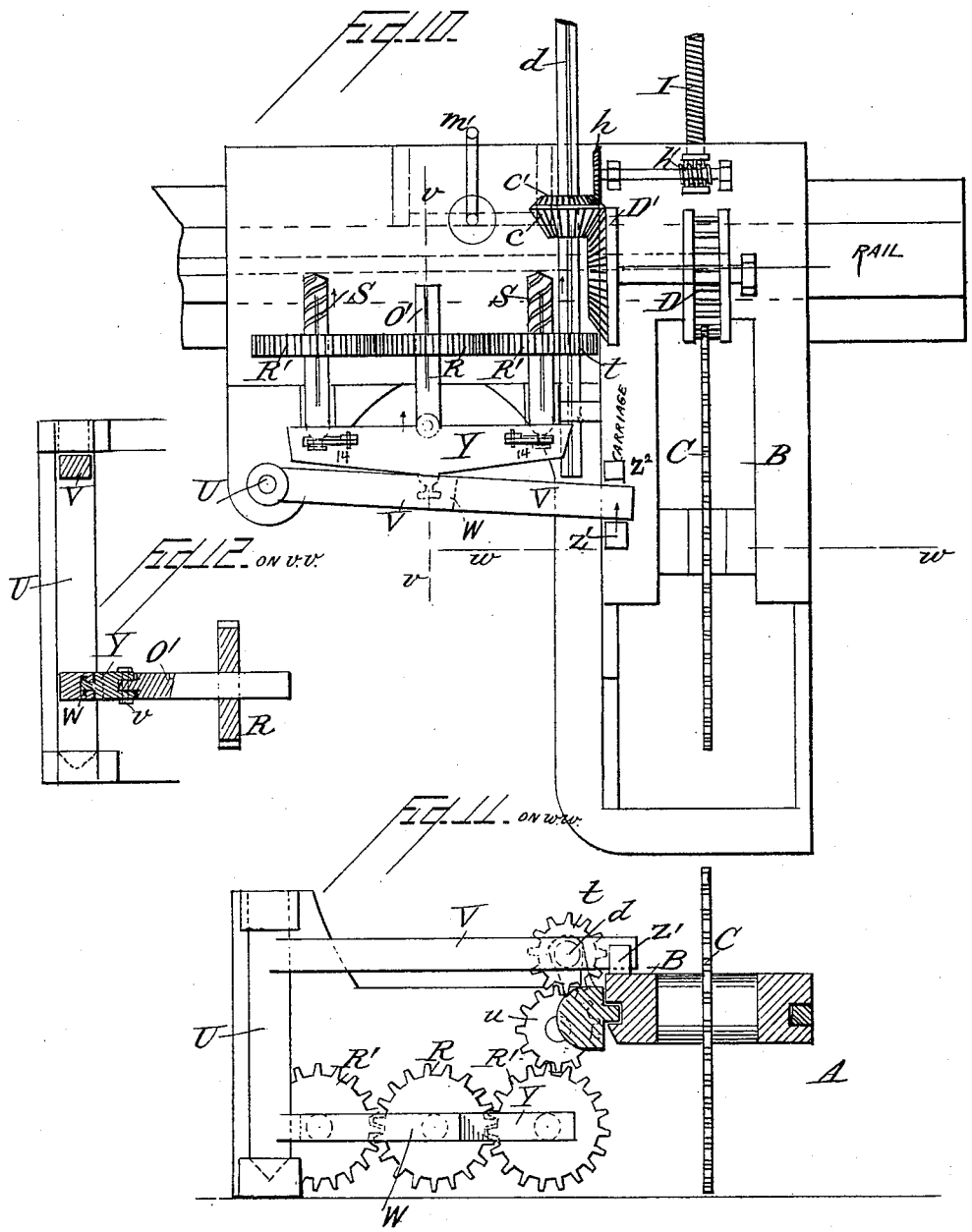

WILBERFORCE B. HAMMOND, OF BOSTON, MASSACHUSETTS, ASSIGNOR TO THE HIGLEY SAWING AND DRILLING MACHINE COMPANY, OF NEW YORK, N. Y.

MACHINE FOR CUTTING METALS.

SPECIFICATION forming part of Letters Patent No. 460,679, dated October 6, 1891.

Application filed May 11, 1889. Serial No. 310,421. (No model.)

*To all whom it may concern:*

Be it known that I, WILBERFORCE B. HAMMOND, a citizen of the United States, residing at Boston, in the county of Suffolk and State of Massachusetts, have invented certain new and useful Improvements in Machines for Sawing and Drilling Metals; and I do hereby declare the following to be a full, clear, and exact description of the invention, such as will enable others skilled in the art to which it appertains to make and use the same.

In the accompanying drawings, Figure 1 is a side view of a machine embodying my improvements. Fig. 1$^a$ is a sectional detail view of certain of the parts. Fig. 2 is a plan view of the entire machine. Fig. 3 is a detail view of a portion of the mechanism for operating the drilling or boring appliance. Fig. 4 is a cross-section on line $z\ z$ of Fig. 5. Fig. 5 is a detail sectional view of a somewhat modified form of the vise or clamping mechanism which holds the work firmly in place while it is being operated upon. Fig. 6 is an enlarged sectional view on line $y\ y$ of Fig. 2. Fig. 7 is an enlarged diagram view of a portion of the saw and the trundle-wheel which operates it. Fig. 8 is a small view similar to Fig. 7 and showing a saw with a different number of teeth from that in Fig. 7. Fig. 9 is a plan view of a portion of a modified form of saw, which has indentations in the side thereof near the periphery instead of having gear-teeth in the periphery. Fig. 10 is a plan view showing a modification in the construction and arrangement of the boring and drilling attachment. Fig. 11 is a cross-section on line $w\ w$ of Fig. 10. Fig. 12 is a cross-section on line $v\ v$ of Fig. 10. Fig. 13 is a detail view of a portion of a modified form of the saw, which has only one cutting-tooth intervening between every two successive gear-teeth, said cutting-teeth being of a peculiar form, and shows the pinion with sides, which with this form of saw is substituted for the trundle-wheel. Fig. 14 is a detail sectional view of the small rubber cushion or spring arranged in the end of the carriage and operating in connection with the carriage feed-screw, so as to guard the saw-teeth from rough usage during the operation of the machine.

Similar letters and numerals of reference designate corresponding parts throughout all the different figures of the drawings.

A denotes the main frame-work of the machine, which may have any suitable and desirable form, outline, and arrangement to enable the several mechanical parts which constitute my improved machine for cutting metals to be properly arranged, relatively, in connection therewith so as to accomplish the purposes for which the machine is constructed and operated.

B denotes the reciprocating saw-carriage, adapted to move horizontally forward or backward upon the guide-bars $a$ and $b$. (See Fig. 2.) The saw, milling-tool, or cutter C has its arbor suitably journaled in the sliding carriage B. The work—for instance, a railway-rail—upon which the the saw or cutter is to operate is arranged in the machine at right angles to the saw or cutter. The rail is clearly shown in Figs. 1, 2, and 6. By referring to Fig. 2 it will be evident that the reciprocation of the sliding carriage B will serve to feed the saw toward the work and keep it in close contact therewith, so that the railroad-rail or other metal bar may be cut through in the desired manner.

The saw which I use in my improved metal-cutting machine has two kinds of teeth. It has the regular and ordinary saw-teeth $k$ and also the deep peripheral indentations $l$, which serve as gear-teeth and which are entered by the rounds of the trundle-wheel or the teeth of the pinion which operates the saw. There may be any number of saw-teeth $k$ between two consecutive gear-teeth $l$. Thus in Figs. 1 and 7 I have shown three cutting or saw teeth $k$ between each two of the gear-teeth. In Fig. 8 there are two saw-teeth $k$ to each gear-tooth $l$. In Fig. 13 the saw or cutting teeth and the gear-teeth are equal in number. The cutting-teeth in Fig. 13 are peculiarly shaped. By inspection of the drawings it will be seen that on one side they are shaped as saw-teeth, while on the other side they are epicycloidal in form. I am limited, therefore, to no special number of the saw-teeth and gear-teeth and to no special form thereof, but may proportion and shape these teeth as desired. In Fig. 9 a modification of the saw is shown, said modification having all the teeth along the periphery saw-teeth, while the sides of the saw near the edge are provided with series of indentations serving a like purpose as the gear-teeth in that form of the saw shown in Figs. 7, 8, and 13. These indentations (represented in Fig. 9) are substitutes for the deep peripheral indentations, and hence, if desired, the saw may be constructed after the pattern of Fig. 9, instead of being made in accordance with the other figures of the drawings. Experience and the exigencies of individual cases will determine the best form to adopt.

The saw or cutter is operated by means of a trundle or lantern wheel D, the rounds, pins, or trundles of which enter the gear-teeth $l$ of the saw, and thus rotate the latter and cause its saw-teeth to act upon the work—such as, in this instance, the railway-rail—and cut said work in the desired manner; or said saw is operated by means of a pinion or gear, as $D^2$, Fig. 13, having teeth that engage the gear-teeth $l$ of the saw. The rounds of the trundle or lantern wheel D may be made movable, if desired, so as to revolve and slide in the side of the wheel, so as always to present a new wearing-surface to the saw or gear teeth, thus reducing the wear; or these rounds or trundles may be made of a center bolt covered with a little piece of pipe or hollow steel cylinder, which may slide axially or revolve, so as easily to be renewed when worn, as well as to reduce the wear. By this mode of applying power to the saw by causing a trundle-wheel or pinion to act thereon in the manner just specified a positive rotary motion is communicated to the saw. It is well known that a circular saw actuated by the application of power at the center or axle thereof would at once buckle if driven as slowly as my saw when operating to cut hard substances—that is to say, at a speed of sixty feet per minute—because there is such a compressing force exerted upon the saw in this position. By applying the driving-power, however, at the periphery of the saw and by having such a short distance between the cutting surface or point and the driving surface or point the thin saw will stand firm and rigid without buckling, because it is in tension all the time. Special attention, therefore, is hereby called to this feature of my improved machine, and the excellence of my method of applying power to the saw should be noted. The short distance between the cutting-point and the driving-point of the saw is an important matter.

The trundle-wheel D is suitably journaled in supports on the main frame, (see Fig. 1,) and has a bevel-gear D', which intermeshes with a bevel-pinion $c$, carried by a horizontal shaft $d$, whereon is also another bevel-pinion $e$, that engages the horizontal bevel-gear H on the vertical shaft $g$. (See Fig. 1.) This vertical shaft $g$ carries another bevel-gear G, to which motion is imparted by a bevel-pinion F on the shaft $f$, journaled in the standards on main frame and provided at each end with the crank-handles E E, whereby it is actuated by hand. The operation of the crank-handles E E will, through the system of gearing just described, impart rotary motion to the trundle-wheel D or to the pinion $D^2$, should that be used, which will be communicated to the saw C with the effect thereon just described. The various bevel gears and pinions just mentioned may be toothed bevels or friction-wheels, as preferred. I generally employ the friction-wheels, but do not desire to be restricted thereto, but reserve the liberty of employing any kind of gearing that may be deemed most serviceable and efficient. The horizontal shaft $d$ is provided with a key seat or groove running lengthwise, and either the bevel-pinion $e$ or the pinion $c$—it matters little which—is loose upon said shaft $d$, so that the shaft may slide through the one or the other gear, as the case may be, during the reciprocations of the sliding carriage.

The actuation of the handles E E not only imparts a positive revolution to the saw, but serves to properly move the saw-carriage so as to control the feed. This is accomplished in the following manner: The pinion $c$ carries upon its shoulder another bevel-pinion $c'$, which meshes with the bevel-pinion $h$, located at right angles to pinion $c'$, said pinion $h$ being on the head of a suitably-journaled worm-shaft $h'$, that engages and actuates the feed screw-shaft I. This shaft I works in a correspondingly-threaded sectional nut I', (shown in dotted lines in Fig. 2,) which nut is secured on the main frame A. It is constructed like the common sectional nut, and is governed by a hand-wheel $i$, whereby the nut can be opened or closed. The revolution of the shaft I draws the sliding carriage with its saw forward toward the work, and when it is desired to allow the carriage to move back again into position to begin work anew the sectional nut I' may be easily opened by a manipulation of the handle $i$, Fig. 2, to permit the back reciprocation of the sliding carriage. I often find it desirable and convenient, however, to dispense with the sectional nut and to use a solid nut instead. The carriage can then be backed by revolving the feed-screw with a quick motion. The solid nut is shown in full lines in Fig. 14 and in dotted lines in Fig. 1ᵃ. Reference to Fig. 1ᵃ will explain best the construction of the parts which I am now describing. The head 8 of the worm is pressed against the bevel-pinion $h$ on the shaft $h'$, which pinion $h$ engages the pinion $c'$, the pressing of the worm-head against said pinion being effected by means of a spring 9, the tension of which is regulated by a wedge 10, which is notched, as shown, in order that it may be better held in whatever position it may be driven into. By the provision of these parts the saw is eased in its motion and the breakage of the teeth is obviated. With this construction the saw should never break a tooth. When the solid nut is employed, the reversing of the carriage is accomplished by having a couple of clutches 1 and 2 arranged upon the shaft $d$, said clutches being connected by a horizontal bar 6, which is moved by means of a lever-handle 7. This handle is constructed in such a manner that it has within it a spindle, as shown, reaching down to a stationary fulcrum on the frame or standard. A spring is coiled around the spindle, and there is sufficient room in the handle to allow said spindle to oscillate either to the right or to the left. The spring is used to cause a tension in the device. Whenever the handle is placed on one side or on the other side of a vertical position, the spring throws it strongly in that way, so that one clutch or the other is always in place engaging its corresponding half, for it will be seen that one-half of the clutch 1 is secured to the bevel-pinion $c'$ and one-half of clutch 2 is secured to a gear-wheel 3 on the shaft $d$. The gear-wheel 3 engages a pinion 4 on a stud on the main frame, and the pinion 4 engages a pinion 5 on the feed screw-shaft I. It will be seen, therefore, that by throwing the lever-handle 7 to the right the bar 6 will be reciprocated to the left, and thus the left-hand clutch 1 engaged, and so the saw will operate and cut. By throwing the lever-handle 7 to the left and causing the parts of the clutch 2 to become engaged the train of gears 3, 4, and 5 will be set in motion, the saw stopped in consequence, and the saw-carriage quickly run back. The gears of course will be properly proportioned in size, so as to accomplish this result in the best way.

In connection with the sliding carriage and the feed-screw for operating the same I have devised an improvement which I consider to be of great importance, because its object is to still further guard the saw-teeth from the rough usage which so often results in breaking or injuring them. This improvement is best shown in Fig. 14, and consists, essentially, in a small stiff spring, rubber cushion, or some other flexible or elastic material or substance located in the end of the saw-carriage in such a manner as to operate against the head of the feed-screw. In Fig. 14 it will be noticed that the end of the saw-carriage is provided with a recess 12, which is entered by the end of the feed-screw I. In this example of the improvement a stiff spring 11 is located within the recess 12 in such a manner as to bear upon the end of the feed-screw. I use the stiff spring here only by way of example, as any other elastic device may be substituted therefor at pleasure. It will be manifest that this mode of connecting the ends of the feed-screw and the saw-carriage will greatly enhance the ease of movement of the carriage. If the saw should become slightly eccentric or small particles of harder material should be struck in the rail or other work which may be undergoing the process of sawing, or if two or three of the saw-teeth should become dull and the following teeth be in consequence required to do an extra amount of cutting, this improved device of mine will permit immediate relief to the cutting-point of the saw, because this cushioned connection of feed-screw and carriage permits a delicacy of movement not otherwise to be obtained. If the obstructing matter in the work should be very serious, the friction-clutch, which has been above described, on the feed will loosen, and therefore the saw will not be fed forward until the trouble has passed. This will add greatly to the life of the saw. This cushioning device, therefore, is an important feature. It may be used not only with the construction described in this case, but also with any other kind of a feeding device, carriage, or saw.

I will now describe how the work to be operated upon—such, for instance, as a railway-rail or a piece of metal or wood—is held firmly in position while being cut. Referring to Fig. 1, J and K denote the jaws of a sort of vise within which the work is placed. Said parts J and K are portions of the main frame-work of the machine. Their inner opposing faces are suitably fastened or shaped to enable them them to serve as the jaws of a vise and to grip the work firmly between them. The part J is supplied with a movable jaw or jaws $j$, Fig. 5, which are forced forward by means of the wedge $m$, which is pressed down by the operation thereupon of the hand-crank $m'$. This hand-crank is connected with a screw-shaft passing through a box in the upper end of the jaw J and entering the interior recess in said jaw, where the lower end of said screw-shaft is loosely connected to the upper end of the wedge $m$, as shown. It will be manifest that the revolution of the crank $m'$ in one direction will force the wedge $m$, downward and thus press the movable jaw $j$ closely against the railway-rail, which will be held tightly between said movable jaw $j$ and the jaw K. On the other hand, a reverse movement of the crank $m'$ will serve to lift the wedge $m$, and thus disengage the railway-rail or other work upon which the machine may be operating.

In Fig. 5 I have shown a vise of more general application than that delineated in Fig. 1. With this vise, if the frame is attached to a bench or other solid and firm support, this form of machine may be used for shop-work and various purposes. Thus a machine which was primarily adapted for hand-power may be easily transformed into a machine to be operated by other driving-power.

In the form of vise in Fig. 5 the jaws J and K, the movable jaws $j$, wedge $m$, crank $m'$ and its screw-shaft are substantially the same as the parts in Fig. 1; but in Fig. 5 it will be seen that the jaw J is movable upon the horizontal bar L, so that it may move to a greater or less distance from the jaw K. There is also a clutch M movable upon the bar L and operated by the hand-lever $n$. Whenever the jaw J is moved along the bar L, its movement will be accompanied by the clutching device M, so that when the jaw J has been adjusted to the proper position it may be held there firmly in place by simply clutching the device M firmly upon the bar L close up against the jaw J. The wedge device may then be operated by manipulating the crank $m'$, and thus the movable jaws $j$ made to press against the work. Sometimes not only the left-hand jaw J, but also the right-hand jaw K, is made movable upon the bar L and should be provided with a clamp, as shown in dotted lines in Fig. 5, so that in cutting long cuts the length of the cut will not be limited to the possible motion of the carriage; but by pushing back the carriage and sliding both sections of the vise along some distance a second cut or extension of the first can easily be made. The form of the device shown in Fig. 5 will be found very serviceable in actual practice.

It will be found desirable to bore or drill holes in the metal, especially rails, which may be cut by my improved machine, and it is best that this drilling operation should take place simultaneously with the cutting operation. Therefore in order to accomplish this I have provided my machine with a boring or drilling attachment actuated by connection with the same crank-handles E E which are used to drive the saw C and also to reciprocate the sliding carriage. The connection between the actuating mechanism and the drilling mechanism is preferably made by means of a flexible shaft, which can be easily connected or disconnected. Thus the operation of drilling may proceed simultaneously with the operation of cutting, or by disconnecting or throwing off the flexible shaft the cutting or sawing operation may still go on, while the drills remain idle.

I will now proceed to describe one form of the drilling or boring attachment which may be employed in my improved metal-sawing machine. One or more drills may be used, as desired.

O designates a suitably-journaled shaft, (see Fig. 2,) and N is the flexible shaft connecting the shaft O with the vertical shaft $g$, above described. (See Fig. 1.) Manifestly, therefore, the revolution of the crank-arms E E, which imparts motion to the vertical shaft $g$, will, through the flexible shaft N, cause the shaft O to be rotated. On the shaft O is a gear R.

S S denote two drills provided, respectively, with the gears R′ R′, which intermesh with the gear R. Evidently there may be more than two drills, if desired, or only one drill may be employed. The number of the drills will depend upon the character of the work to be performed. Hence I am restricted to no particular number. On the shaft O is also a cam $o$. (See Figs. 2 and 3.) This cam works within a slotted projection $p$ on the plate P, that slides horizontally in suitable ways on the main frame-work of the machine and carries pawls $p'$ $p'$, which pawls or dogs engage ratchet-wheels Q Q. Fig. 6 will serve to show the detailed arrangement of said ratchets, pawls, &c. These ratchets are integral with the internally-screw-threaded shafts Q′ Q′, within which a portion of the drill is located. Within each of the tubular parts Q′ is a cap T, having a feathered engagement with a part of the frame, which keeps it from turning. Said cap T is screw-threaded to engage the internal screw-threads on the tubular part Q′, and it is loosely connected in the usual way with the revolving drill S. As the part Q′ revolves the cap T will be moved endwise and will impart a feeding motion to the drill. The operation, therefore, of this drilling mechanism when pressing the drills forward into their work will be as follows: The shaft O, gear R, and gears R′ R′ will impart a constant rotation to the drills S S. The cam $o$, acting upon the sliding plate, will, through the pawls and ratchet-wheels just described, intermittently give a partial rotation to the tubular shafts Q′ Q′, and each intermittent motion of these shafts will transmit a slight forward impulse to the caps T T, which will thus act to feed the drills forward against their work. After the drilling has been accomplished it will be found necessary, of course, to retract the drills or remove them from the holes which have been bored. In order to do this effectively, the gear R on the shaft O is feathered thereon or otherwise arranged, so that it may slide out of contact with the gears R′ R′ and into contact or engagement with the wheels Q. Thus by throwing off the dogs or pawls and turning the handles E E in the proper direction the drills may be backed up or withdrawn from the holes which have been bored. In this way it will be evident that the drilling mechanism may be made to operate accurately, surely, and effectively, and said mechanism will form a valuable adjunct to the rest of the machine for the purpose for which said machine is adapted. Especially when the machine is used to cut railroad-rails will it be convenient to have holes drilled in the rails at the same time that said rails are being cut into sections by the sawing mechanism. This form of mechanism for drilling which I have just described is only one out of many that might be devised and arranged for use in the present machine. I give it by way of example only.

In Figs. 10, 11, and 12 I have represented the preferable modification or construction of the boring or drilling attachment. The essential change in the construction of the machine to adapt it to this alteration thereof consists in the placing of the vise or gripper upon that side of the machine next to the operating-handles and in transferring the boring or drilling attachment to that side of the machine where the vise is located in the other figures of the drawings and also in rearranging and changing certain parts of the boring mechanism. The flexible shaft N, employed in that form of the drilling appliance shown in Figs. 1 and 2, is now dispensed with, and the modified drilling appliance is operated directly by power from the shaft $d$, which shaft is removed a short distance farther away from the plane of the saw than the position occupied in Figs. 1 and 2. It will be noted that in order to suit this change in the location of the shaft $d$ the gear D' on the trundle-wheel D will be removed a little distance from the trundle-wheel, whose shaft will be extended for the purpose. (See Fig. 10.) The shaft $d$ is provided with a spur-gear $t$, which, through an intermediate gear $u$, serves to actuate the gear R' on one of the drills S. The gear R' in turn actuates the gear R on the shaft O', and said gear engages and actuates, also, the other gear R' on the other drill S. The gears R R' R' are feathered upon their respective shafts and drills, so that they may be allowed to slide thereon during the revolution of said shafts and drills. So much for the means for imparting rotary motion to the drills. I proceed to describe the manner of feeding the drills forward to their work and also of retracting the same when the work has been accomplished.

U denotes a vertical shaft suitably journaled in the frame of the machine and having upper and lower horizontal arms V and W. The end of the upper horizontal arm V is located above the saw-carriage B and between the lugs $z'$ and $z^2$ on said carriage, so that when the carriage during its travel comes to the point where the saw begins to cut into its work the lug $z'$ will begin to exert a pressure upon the arm V, which will rotate slightly the vertical shaft U, thus moving the lower arm W and pressing the same against the horizontal rock-lever Y, fulcrumed by means of a pivot $v$ on the end of the shaft O', which carries the gear R, said rock-lever or evener being connected by a bolt or button, as shown in Fig. 10 and best in Fig. 12, to the arm W. The extreme ends of the rock-lever or evener Y are respectively in contact with the ends of the drills S S. The ends or heads of these drills are provided with buttons or latches 14 of any simple and ordinary construction, so that in the reversing operation of the carriage they may be connected to the rock-lever Y, so as to be moved back also. When the arm W presses upon the rock-lever Y, the drills S S will be fed forward. It will thus be evident that this feeding forward of the drills will be proportional to the travel of the saw-carriage in the advance motion of the saw into its work. If it should be desired to use but one drill, a wedge may be placed in front of one end of the rock-lever or evener Y. Thus either end of the rock-lever may be prevented from exerting a pressure upon its adjacent drill, which will thus be left motionless as far as its feed is concerned. When the carriage recedes from its work after the rail or other object has been cut, it is evident that the lug $z^2$ will act upon the lever-arm V, which will oscillate the vertical post U and move the arm W, which, being connected, as indicated, to the rock-lever Y, will pull it back also, and it, being attached to the drills, will remove them from their work.

I have thus described the essential elements of my invention and detailed the construction, arrangement, and combination of the same. I do not wish, however, to be confined to the precise construction and combination of parts, for doubtless variations within certain limits may be found advisable during the practical construction of the machine. I reserve, therefore, the liberty of making such changes in the structure and arrangement of parts as may be found fit and proper.

I find it convenient to arrange near the saw-edge a magnet or magnets, (examples of these are shown at 21 and 22, Figs. 1 and 2,) so fixed that the chips or dust cut by the saw may be drawn away from the saw as soon as made, thus keeping the cut and saw clear. This will greatly reduce the breakage and wear of the saw, as the teeth sometimes have to cut the chips in two several times after severing them. Sometimes a tooth breaks and wedges in the cut in consequence of this.

Having thus described my invention, what I claim as new, and desire to secure by Letters Patent, is—

1. In a machine for sawing or cutting metal, a circular saw or milling-tool having gear-teeth and saw-teeth, substantially as described.

2. The herein-described metal-cutting device, having its periphery provided with indentations to serve as gear-teeth, said indentations being arranged alternately with one or more saw-teeth, substantially as described.

3. In a machine for cutting metal, a circular saw or milling-tool having its periphery provided with gear-indentations located at suitable points among the saw-teeth, in combination with a trundle or gear wheel or equivalent device whose rounds, projections, or teeth are adapted to enter or engage said gear-indentations, substantially as described.

4. In a machine for sawing or cutting metal, a circular saw having its periphery provided with gear teeth or indentations located at suitable points alternately with the saw-teeth, in combination with the main frame of the machine, a movable saw-carriage in which the circular saw is mounted, a trundle-wheel or equivalent device whose rounds or teeth are adapted to enter the gear-teeth of the saw for the purpose of rotating the same, and the mechanism for reciprocating the saw-carriage and operating the trundle or other wheel, substantially in the manner and for the purpose described.

5. In a saw for sawing or cutting metals, the combination of the saw or milling-tool, constructed with gear teeth or indentations, which alternate at suitable points on the periphery with the saw-teeth, the wheel for operating said saw, the mechanism for rotating said wheel, and the mechanism for holding the work while it is being operated upon, substantially as described.

6. In a machine for sawing or cutting metal, a circular saw having gear-teeth and saw-teeth on the periphery thereof, and an operating-wheel therefor whose teeth or projections enter the gear-teeth, substantially as described.

7. In a machine for sawing or cutting metals, the combination of the saw or milling-tool having gear-indentations located at certain points on the periphery alternately with the saw-teeth, the operating-wheel, the gear for the saw, whose teeth or projections are adapted to enter said gear-indentations for the purpose of rotating the saw, the movable saw-carriage in which the saw is mounted, the shaft with its pinions, one of which engages a bevel-pinion on the saw-operating wheel, the screw-shaft for actuating the saw-carriage, the crank-handles, and connecting gearing and shafting, whereby the saw-operating wheel and the sliding saw-carriage are operated in unison, substantially in the manner and for the purpose described.

8. In a machine for sawing metals, the combination of the main frame-work, the sliding saw-carriage, the screw feed-shaft for actuating said carriage, the crank-handles, and connecting gearing and shafting whereby the said carriage is reciprocated, substantially as described, 9. In a machine for sawing or cutting metal, the combination of the main frame, the saw-carriage arranged to slide in suitable ways, the screw feed-shaft for actuating the saw-carriage, the worm-shaft having a bevel-pinion and its worm engaging the feed shaft, the horizontal shaft with its pinions, one of which engages said bevel-pinion on the worm-shaft, while the other engages the horizontal bevel-gear on the vertical shaft, and the crank-handles, shafting, and gearing for actuating said vertical shaft, substantially as described.

10. In a machine for sawing metals, the combination of the main frame, the sliding saw-carriage B, screw feed-shaft I, the worm-shaft H', engaging the feed-shaft and having a bevel-pinion $h$, the horizontal shaft $d$, having a bevel-pinion $c'$, engaging bevel-pinion $h$, a bevel-pinion $e$, engaging horizontal bevel-gear H on shaft $g$, the bevel-gear G on said shaft $g$, and the horizontal shaft $f$, carrying pinion F, engaging gear G, and provided with crank-handles E E, all substantially as described.

11. In a machine for sawing metals, the combination of the machine-frame, the sliding saw-carriage, the screw feed-shaft I, the worm-shaft engaging it and having bevel-pinion, the shaft $d$, actuated by suitable gearing, cranks, &c., the gear 3 on shaft $d$, engaging intermediate gear 4, which meshes with gear 5 on the screw feed-shaft I, and the clutch mechanism 1 and 2 on shaft $d$, connected by bar 6 and actuated by lever 7, all arranged and operated substantially as described.

12. In a machine for sawing metal, the combination, with the sliding saw-carriage and the screw feed-shaft for actuating the same, of a cushioning or elastic connection between said shaft and the carriage, whereby the carriage is made susceptible of a greater delicacy of movement for the purpose of protecting the saw-teeth, substantially as described.

13. In a machine for sawing metals, the combination of the saw-carriage, the screw feed-shaft for actuating the same, the end of which enters a recess in the end of the carriage, and an elastic spring or cushion within said recess bearing upon the end of the feed-screw, substantially as and for the purpose described.

14. In a rail or metal sawing or cutting machine, the saw or milling-tool C, having regular saw-teeth $k\ k$ and gear teeth or indentations $l$, said gear-teeth being arranged alternately with series of one or more saw-teeth, substantially in the manner described.

15. The herein-described circular saw C, having saw-teeth $k\ k$ and gear teeth or indentations $l$, said gear-teeth being arranged alternately with the saw-teeth, in combination with the trundle-wheel D, whose rounds are adapted to enter the gear-teeth $l$, and thus actuate the saw, substantially in the manner and for the purposes described.

16. The combination of the main frame A, the saw-carriage B, movable in guides on said frame, the circular saw C, having gear-teeth $l$ and saw-teeth $k$ and carried in a movable carriage B, the trundle or other wheel D, whose rounds or teeth are adapted to enter the gear-teeth $l$ and having a bevel-pinion D', the shaft $d$, carrying pinions $c$ and $e$, said pinion $c$ engaging the pinion D', the crank-handles E E on shaft $f$, having pinion F, and the gears G and H on the vertical shaft $g$, said gear G being operated by pinion F and said gear H operating pinion $e$, substantially as described.

17. The combination of the main frame A, the saw-carriage B, the circular saw C, having gear-teeth $l$ and saw-teeth $k$, the movable wheel D for operating said saw and having bevel-pinion D', the horizontal shaft $d$, having pinions $c$ and $e$ thereon, said pinion $c$ engaging pinion D' and having the supplemental bevel-pinion $c'$ attached thereto, the crank-handles E E, shaft $f$, having pinion F, the bevel-gears G and H on shaft $g$, said gear G being operated by a pinion F and said gear H operating pinion $e$, the feed-screw I for operating the movable saw-carriage B, and the worm-shaft $h'$, engaging said screw-shaft and having pinion $h$, that engages pinion $c'$, and the sectional nut I' on the main frame, all substantially as described.

18. The combination of the main frame of the machine, the circular saw or milling-tool mounted in a movable carriage, the trundle-wheel whose rounds are adapted to actuate said saw, the mechanism for operating said trundle-wheel and for reciprocating the movable carriage, and a vise or gripper for holding the work while being operated upon, consisting, essentially, of the jaws J and K, said jaw J having movable jaw or jaws $j$, and the wedge $m$ and crank $m'$ for operating said movable jaw, all substantially as described.

19. In a machine for sawing metals, the combination, with the actuating devices and the gripping devices, of a drilling appliance consisting, essentially, of one or more drills, each carrying a gear to which motion is communicated from the actuating mechanism, a rock-lever or evener pivoted to a shaft that carries a gear intermediate with and engaging the gears on the drills, the opposite ends of said rock-shaft pressing upon the ends of the drills, which are connected thereto, and an upright post having upper and lower arms rigidly connected thereto, the lower of said arms being connected to and operating upon the rock-lever or evener and the upper of said arms being actuated by the saw-carriage so as to feed the drills forward or retract them at the proper time, substantially as described.

20. In a machine for sawing metals, the herein-described drilling mechanism, consisting, essentially, of the drills S S, having gears R' R' thereon, the intermediate gear R, engaging said gears and located on shaft O', said series of gears receiving motion from the actuating mechanism of the machine, the rock-lever Y, pivoted to the end of shaft O' and having its opposite ends connected to and operating upon the rear ends of the drills S S, the vertical post U, having the rigid upper arm V and the rigid lower arm W, said arm W being connected to and operating upon the rock-lever Y and said upper arm V being located in contact with lugs on the saw-carriage, substantially as and for the purpose described.

21. The combination, with a saw, of feed mechanism for advancing the saw toward the work, said feed mechanism comprising a cushion of resilient material, substantially as described.

22. In a machine for sawing, a magnet or magnets arranged near the saw-edge to draw away the dust and chips.

In testimony whereof I affix my signature in presence of two witnesses.

WILBERFORCE B. HAMMOND.

Witnesses:
JAS. A. MILLER,
HOMER ALBERS.